Patented July 5, 1938

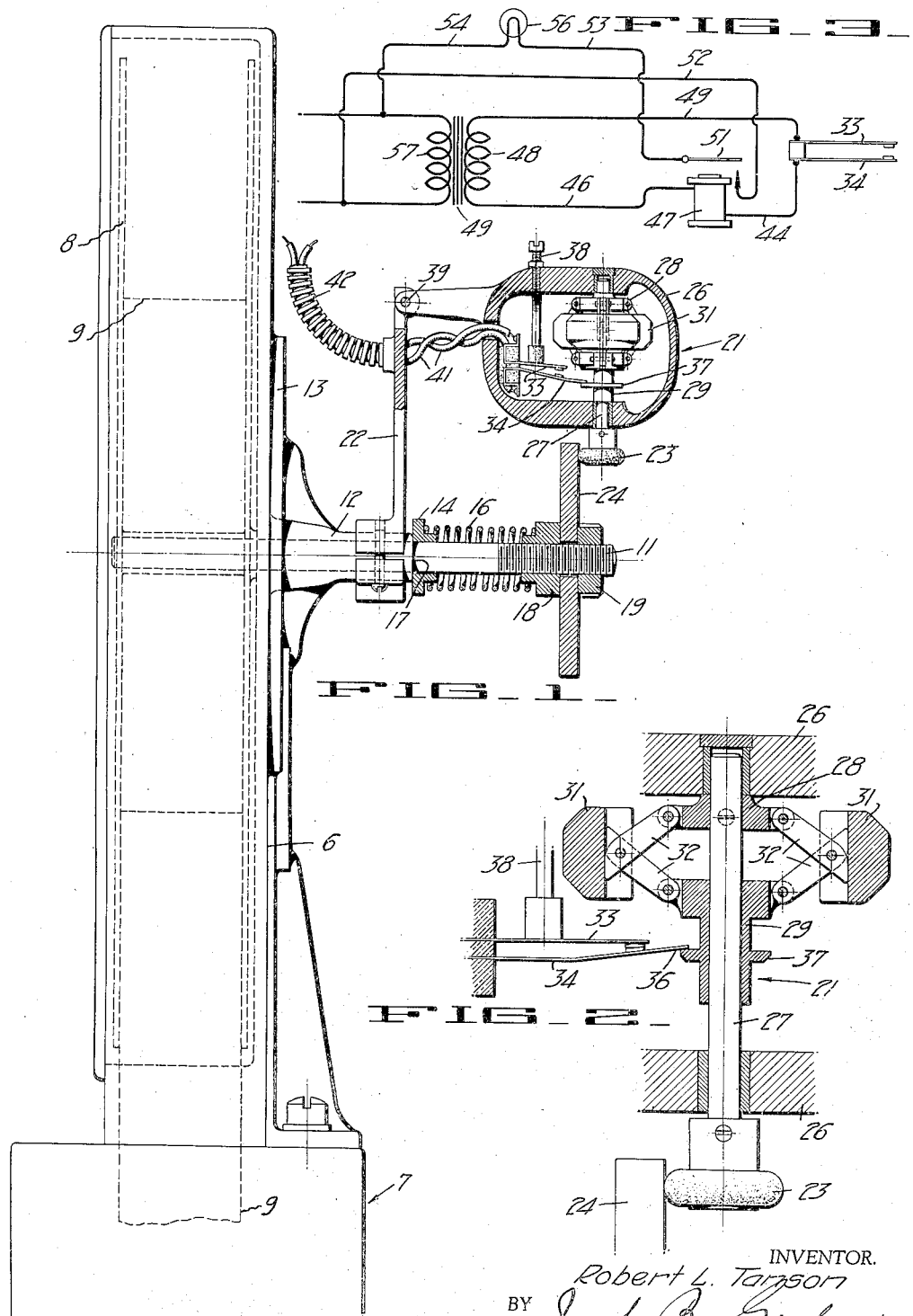

2,123,084

UNITED STATES PATENT OFFICE 2,123,084

CENTRIFUGAL SWITCH

Robert L. Tanson, Oakland, Calif.

Application November 9, 1936, Serial No. 109,916

8 Claims. (Cl. 200—80)

The invention relates to motion picture projection machines and more particularly to devices incorporated in such machines for closing a circuit for warning the operator of the approach of the end of the film in the machine being projected.

Devices of this nature have heretofore involved the use of means such as rollers or the like, which is engageable with the film on one of the winding or unwinding reels in the projection machine and indicates by the position of the film on the reel the relative amount of film which has been projected or still remains to be projected. As will be understood, the use of such devices necessitates a direct engagement of the indicating means with the film and are likely therefore to scratch or wear the film or otherwise cause a shortening of the like of the film. In accordance with the present invention, and as a principal object thereof, I have provided a centrifugal switch of the character described which operates entirely separate from the film and does not require any engagement whatever with the film.

Another object of the invention is to provide a device of the character described which will be absolutely dependable for substantially an unlimited period of use and which may be adjusted to close a circuit to warn the operator of the approaching end of the film being projected at different intervals preceding the projection of the end of the film.

The invention possesses other objects and features of advantage, some of which, with the foregoing, will be set forth in the following description of the preferred form of the invention which is illustrated in the drawing accompanying and forming part of the specification. It is to be understood, however, that variations in the showing made by the said drawing and description may be adopted within the scope of the invention as set forth in the claims.

Referring to said drawing:

Figure 1 is a side elevation shown partly in section of a part of a motion picture projection machine with the means of the present invention incorporated therewith.

Figure 2 is an enlarged vertical sectional view of a portion of the means of the present invention.

Figure 3 is a diagrammatic representation of the electric signal means and circuit used with the device illustrated in Figures 1 and 2.

As is well understood, the common type of motion picture machine utilizes a film holding and advancing means which includes winding and unwinding film reels and a means intermediate such reels for advancing the film at a constant lineal speed through the projection portion of the machine. While the movement of the film across the light source of the machine is effected by a series of rapid interrupted short movements the result is to draw the film off of the unwinding or idler reel and to wind the same onto the winding reel at a substantially constant lineal speed. However, as the film is taken off of the idler reel or wound upon the winding reel the reels change their angular velocity or speed of rotation as the film on the reels approaches or moves away from the center of rotation of the reels. Thus, the speed of rotation of the reels is an accurate indication of the radial position of the film on the reel, or in other words the amount of film on the reel, and this fact is taken advantage of in the present invention for indicating the approach of the end of a film in the machine.

With reference to the accompanying drawing, there is illustrated in Figure 1 a portion of a film casing 6 of a motion picture projection machine 7 which contains the unwinding or idler reel 8 for the film 9. In the form of the construction here shown, the reel 8 is carried on a rotatable shaft 11 which extends through a bearing boss 12 at the outer side 13 of one of the casing walls. Means is provided for checking the movement of the reel and causing the latter to uniformly unwind as the film is drawn therefrom without allowing the formation of slack in the film leaving the reel. In the present construction, this means comprises a collar 14 which is rotatably mounted on shaft 11 and is compressed by means of a helical spring 16 against the end face 17 of the bearing boss, the spring being compressed against the collar 14 by a second collar 18 mounted on the shaft and held axially thereon by a nut 19 threaded on the shaft.

In accordance with the present invention, a speed responsive means 21 is connected with one of the reels, and is effective at a predetermined speed of rotation of the reel to actuate a warning signal. In the present embodiment the speed responsive means is of a mechanical governor type which is driven by the idler reel shaft 11 and is effective to close an electric signaling circuit at a predetermined speed of rotation of the shaft. However, it will be understood, that a different type of speed responsive means may be associated with and driven by the winding as well as the unwinding reel and by means other than the reel shaft and may be used to actuate a mechanical signal means or other type different from the electric signaling circuit here shown. In the specific embodiment here illustrated, a speed responsive means 21 is secured to the bearing boss 12 by means of a mounting bracket 22 and is driven by the shaft 11 by the engagement of a friction drive wheel 23 carried by the means 21 with a disc 24 mounted between the collar 18 and the nut 19 on the shaft 11 and thereby held on the shaft for rotation thereof. The means 21 comprises a housing or casing 26 in which is mounted a rotatable shaft 27 which extends through the casing to an exterior side thereof and is there connected to the friction wheel 23 and is driven by said wheel. Mounted on the shaft 27 within the casing is a pair of sleeves 28 and 29 which are respectively fixed and movable longitudinally along the shaft. A plurality of weights 31 are connected to the sleeves 28 and 29 by means of pivoted links 32 and cause upon rotation of the shaft for the outward movement of the weights and a movement of the sleeves 29 along the shaft 27 towards the sleeve 28. In this manner the longitudinal position of the sleeve 29 on the shaft 27 is determined by the speed or rotation of the shaft, which is in turn proportional to the speed of rotation of the reel, and accordingly, as the speed of rotation of the reel increases the sleeve 29 will move longitudinally along the shaft 27 towards the sleeve 28. Conversely a decrease in speed of the reel will cause a movement of the longitudinal movement of the sleeve 29 along the shaft away from sleeve 28.

This relative movement of the sleeve 29 on the shaft 27 is utilized to close an electric signal circuit at a predetermined position of the sleeve 28 on the shaft or at a corresponding speed of rotation of the reel. As here shown, a pair of electric contact members 33 and 34 are mounted within the casing 26 and are caused to be engaged upon movement of the sleeve to an aforesaid predetermined position. In the present arrangement the contact member 33 is held in fixed position relative to contact member 34 and sleeve 29 while the contact member 34 is of a movable nature and has an outer end 36 extending into an overlying relation with respect to an annular shoulder 37 on the sleeve 29. In this manner the contact member 34 is moved by the shoulder 37 on movement of the sleeve longitudinally on the shaft 27 so as to engage the contact member 34 with the contact member 33 at a predetermined position of the sleeve on the shaft. Preferably, the position of the contact member 33 is adjustable relative to the contact member 34 and the sleeve 29 so as to enable an adjustment or variation of the interval of time at which the warning is effected preceding the projection of the end of the film on the reel. As here shown, this adjustment is effected by means of a screw 38 which is threaded through a side of the casing 27 and is rotatably secured at its inner end to the contact member 33 so that on rotation of the screw the contact member 33 may be moved longitudinally with respect to the shaft 27 and the contact member 34 and sleeve 29.

As an important feature of this specific arrangement the casing 26 is provided with a pivotal connection 39 with the bracket 22 which connection is spaced laterally from and substantially above the disc 24 and has an axis rotation substantially parallel to the plane of the disc. On the other hand, the friction wheel 23 is mounted at the underside of the casing about a vertical axis and engages an outer surface of the disc so that the wheel is held against the disc by the weight of the casing acting through a leverage distance from the pivotal connection 39. Consequently, a proper engagement of the friction wheel 23 with the disc will at all times be insured without the use of springs or other mounting means. Also to permit of a ready movement of the casing about the pivotal connection 39 to engage the wheel against the disc, flexible electric leads 41 are used for the connection of the contact members 33 and 34 and are extended from the casing to the bracket 22 from where the leads may be enclosed by a flexible sheath 42.

Any suitable electric signal means may be connected to the switch contacts 33 and 34 for notifying the operator of the approaching film end or for the setting in operation of any other electric control system other than a signaling means. A suitable circuit and signal means is illustrated in Figure 3, of the drawing, wherein the switch contacts 33 and 34 are connected by means of conductors 43, 44, and 46 in series relation with a relay 47 and a low voltage winding 48 of the voltage reduction transformer 49. On closing of the contacts 33 and 34 the relay 43 is energized to close a pair of relay switch contacts 51 which are connected by means of conduits 52, 53 and 54 in series relation with a light 56, or other electric signal means, and the high voltage winding 57 of the transformer 49. While, I prefer to use a relative low voltage in the circuit including switch contacts 33 and 34, it will be understood that these contacts may be in a series circuit with normal line voltage and a suitable electric signal means.

I claim:

1. In a device of the class described having in combination a rotatable shaft for a film reel, a disc adapted for mounting on said shaft for rotation therewith, a casing adapted for pivotal support about a horizontal axis transversely spaced from and substantially parallel to the plane of said disc and above said disc, a drive wheel carried by said casing for engagement with a side of said disc opposite said axis and held against said disc by the weight of said casing, a switch, and means in said casing driven by said drive wheel and being responsive to the speed thereof to cause the operation of said switch.

2. A device of the class described comprising, a casing, a shaft for a film reel or the like carried by said casing and extending through a vertical side wall thereof, said casing being provided with a bearing boss at the outer side of said wall on said shaft, a collar rotatably mounted on said shaft and engageable with said boss, a second collar rotatably mounted on said shaft in spaced relation to said first collar, a helical spring compressed between said collars, a disc carried on said shaft at the outer side of said second collar, a nut threaded on said shaft and against said disc, a bracket mounted on said boss and extending vertically therefrom, a casing pivoted to said bracket about a horizontal axis substantially parallel to the plane of said disc, a drive wheel carried by said casing and for rotation about a vertical axis and engageable with an outer side of said disc and held against said disc by the weight of said second casing, a governor mounted in said casing and driven by said wheel and a switch actuated by said governor at a predetermined speed of rotation of said shaft.

3. In a device of the class described, the combination of a rotatable shaft, a support for said shaft including a bearing, a disk mounted upon said shaft for rotation therewith, a bracket supported from said bearing, a casing pivotally supported about a horizontal axis transversely spaced from said disk and extending above said disk, a drive wheel carried by said casing for engagement with the side of said disk and held against said disk by the weight of said casing, a switch, and a speed responsive device in said casing driven by said drive wheel and constructed and arranged to actuate said switch when said shaft exceeds a predetermined limit of rotation.

4. A device of the character described adapted for connection to relatively rotary and stationary parts of a machine and comprising, rotary means adapted for mounting on said rotary part, an electric switch, speed responsive means for actuating said switch, mounting means for said speed responsive means adapted for connection to said stationary part and positioning said speed responsive means on said rotary means and providing for the support of said speed responsive means on said rotary means for establishing a driving connection therebetween.

5. A device of the character described adapted for connection to relatively rotary and stationary parts of a machine and comprising, rotary means adapted for mounting on said rotary part for rotation therewith, an electric switch, and a speed responsive mechanism for actuating said switch at a pre-determined speed of said rotary part and adapted for pivotal mounting on said stationary part for support on said rotary means for establishing a drive connection therewith.

6. A device of the character described adapted for connection to relatively rotary and stationary parts of a machine and comprising, rotary means adapted for mounting on said rotary part for rotation therewith, an electric switch, a speed responsive mechanism for actuating said switch at a pre-determined speed of said rotary part, mounting means for said mechanism adapted for connection to said stationary part and providing a pivotal connection for said means at one side of said rotary means for positioning said speed responsive means on said rotary means for support of the former by the latter to establish a driving connection therebetween.

7. A device of the character described for use with a shaft and support therefor, comprising a disc adapted for mounting on said shaft for rotation therewith, a casing, a shaft journaled in said casing, a drive wheel mounted on said shaft exteriorally of said casing, means for mounting said casing from said support for engaging said drive wheel and disc, centrifugal means carried by said shaft within said casing and movable longitudinally of said shaft in proportion to the speed thereof, and electric switch means mounted in said casing for engagement with an actuation by said last named means.

8. In a device of the class described, the combination of a horizontal rotatable shaft, a support for said shaft including a bearing, a disc mounted on said shaft for rotation therewith and having a vertical plane of rotation, a bracket supported from said bearing, a casing pivot supported about a horizontal axis transversely spaced from said disc and positioned above said disc, a vertical shaft in said casing, a drive wheel mounted at lower end of said shaft outside of said casing and held in engagement with a vertical side of said disc by the moment of said casing about said pivotal axis, relatively fixed and movable rings on said shaft within said casing, a plurality of weights, links pivotally securing said weights to said rings to provide a longitudinal displacement of one of said rings proportional to the speed of rotation of said shaft, and an electric switch mounted in said casing and positioned for actuation by said movable ring.

ROBERT L. TANSON.